(12) United States Patent
Banerjee et al.

(10) Patent No.: US 8,151,093 B2
(45) Date of Patent: Apr. 3, 2012

(54) SOFTWARE PROGRAMMABLE HARDWARE STATE MACHINES

(75) Inventors: Soumya Banerjee, San Jose, CA (US); Gideon D. Intrater, Sunnyvale, CA (US); Michael Gottlieb Jensen, Ely (GB)

(73) Assignee: MIPS Technologies, Inc., Sunnyvale, CA (US)

( * ) Notice: Subject to any disclaimer, the term of this patent is extended or adjusted under 35 U.S.C. 154(b) by 1074 days.

(21) Appl. No.: 11/517,569

(22) Filed: Sep. 8, 2006

(65) Prior Publication Data

US 2008/0065868 A1 Mar. 13, 2008

(51) Int. Cl.
*G06F 9/00* (2006.01)
(52) U.S. Cl. ........................... 712/220; 712/226
(58) Field of Classification Search .................. 712/220, 712/226
See application file for complete search history.

(56) References Cited

U.S. PATENT DOCUMENTS 5,446,851 A * 8/1995 Yamaguchi .................. 712/227

OTHER PUBLICATIONS

Riesgo et al.; "Design Process Based on Hardware Description Languages"; 1994; IEEE.*

* cited by examiner

*Primary Examiner* — Chun-Kuan Lee
*Assistant Examiner* — Benjamin Geib
(74) *Attorney, Agent, or Firm* — Sterne, Kessler, Goldstein & Fox PLLC (57) ABSTRACT

The present invention provides software programmable hardware state machines to detect a cause of an error in a processor and prevent the error from occurring. In example embodiments, processors, systems and methods are provided to prevent an unwanted change in architectural state from occurring as a result of execution of a specific sequence of instruction types. A processor core is provided that includes an execution unit, a programmable mask register and a buffer that stores values representing instructions dispatched to the execution unit. The processor core also includes control logic to determine whether there is a match between a sequence in the mask register and a sequence in the buffer and, upon detecting a match, to generate control signals to perform a desired action. The desired action prevents an unwanted change from occurring to the architectural state of the processor. The desired action may be preventing the dispatch of a next instruction, flushing a pipeline, clearing an instruction fetch buffer, generating an exception etc. The processor core further comprises a programmable fix register. In an embodiment, the control logic generates the control signals based on control bits stored in the fix register.

24 Claims, 11 Drawing Sheets

SOFTWARE PROGRAMMABLE HARDWARE STATE MACHINES

FIELD OF THE INVENTION

The present invention generally relates to processors and, more particularly, towards providing in-field solutions to fix hardware bugs in a processor.

BACKGROUND OF THE INVENTION

Functional verification in chip design is the task of verifying that the chip conforms to specification. This is a complex task, and takes the majority of time and effort in most processor and electronic system design projects. Logic simulation may be used to simulate the logic before it is built. Simulation acceleration may be used to apply special purpose hardware to logic simulation. Emulation may be used to build a version of the system using programmable logic. This is expensive, much slower than the real hardware, but orders of magnitude faster than simulation. Formal verification may also be used to prove mathematically that certain requirements are met, or that certain undesired behaviors (such as deadlock or errors) do not occur.

However, design verification is becoming increasingly difficult as processor and electronic system complexity increases. As a result, it is likely that a chip will be sold before a bug (i.e. a problem) can be detected. More than likely, a bug will first be detected by a customer running an application using the chip. Faulty chips in the field can result in recalls of thousands to millions of chips, resulting in heavy financial losses and inconvenience to both the manufacturer and the customer. What is needed is systems and methods to overcome the above mentioned deficiencies in the field without having to recall the chips.

BRIEF SUMMARY OF THE INVENTION

The present invention provides software programmable hardware state machines to detect a cause of an error in a processor and prevent the error from occurring. In example embodiments, processors, systems and methods are provided to prevent an unwanted change in architectural state from occurring as a result of execution of a specific sequence of instruction types. A processor core is provided herein that includes an execution unit, a programmable mask register and a buffer that stores values representing instructions dispatched to the execution unit. The processor core also includes control logic to determine whether there is a match between a sequence in the mask register and a sequence in the buffer and, upon detecting a match, to generate control signals to perform a desired action. The desired action prevents an unwanted change from occurring to the architectural state of the processor. The desired action may be, for example, preventing the dispatch of a next instruction, flushing a pipeline, clearing an instruction fetch buffer, generating an exception, etc. The processor core further comprises a programmable fix register. In an embodiment, the control logic generates the control signals based on control bits stored in the fix register It is a feature of the present invention to prevent the execution of a particular instruction type in a known sequence of instruction types that causes an undesirable change in architectural state of a processor.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention is described with reference to the accompanying drawings. The drawing in which an element first appears is typically indicated by the leftmost digit or digits in the corresponding reference number.

DETAILED DESCRIPTION OF THE INVENTION

The present invention provides software programmable hardware state machines to detect a cause of an error in a processor and prevent the error from occurring. In example embodiments, processors, systems and methods are provided to prevent an unwanted change in architectural state from occurring as a result of execution of a specific sequence of instruction types. Embodiments of the invention allow a user to store in a register a sequence of instruction types whose execution result in an error. Processors and systems in embodiments detect the sequence of instruction types before their execution can cause the error. Embodiments also allow a programmer to program desired actions that can be implemented upon detecting the sequence of instruction types and prevent the error from occurring.

In the detailed description of the invention that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Example Processor

Figure 1:
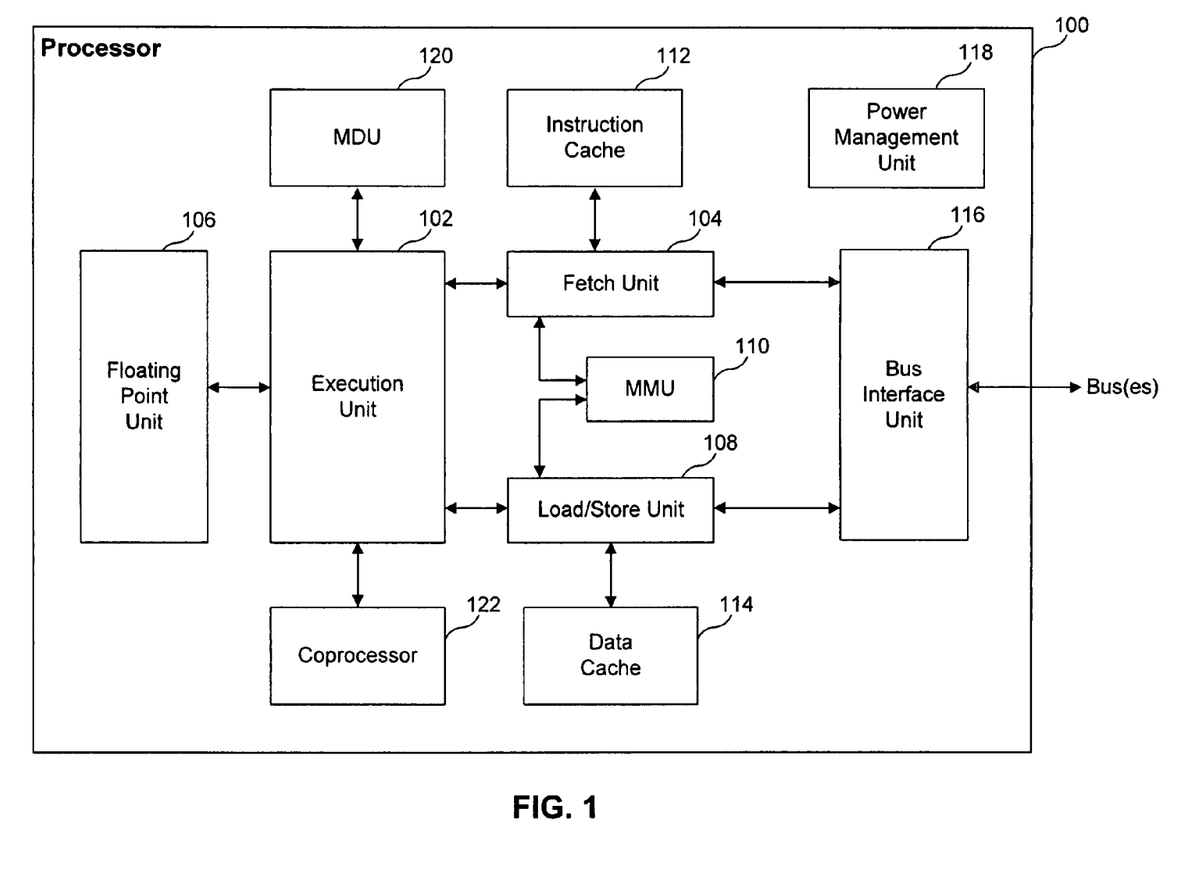
FIG. 1 is a diagram of a processor according to an embodiment of the present invention.

FIG. 1 is a diagram of a processor 100 according to an embodiment of the present invention. As shown in FIG. 1, processor 100 includes an execution unit 102, a fetch unit 104, a floating point unit 106, a load/store unit 108, a memory management unit (MMU) 110, an instruction cache 112, a data cache 114, a bus interface unit 116, a power management unit 118, a multiply/divide unit (MDU) 120, and a coprocessor 122. While processor 100 is described herein as including several separate components, many of these components are optional components that will not be present in each embodiment of the present invention, or components that may be combined, for example, so that the functionality of two components reside within a single component. Thus, the individual components shown in FIG. 1 are illustrative and not intended to limit the present invention.

Execution unit 102 preferably implements a load-store, Reduced Instruction Set Computer (RISC) architecture with single-cycle arithmetic logic unit operations (e.g., logical, shift, add, subtract, etc.). In one embodiment, execution unit 102 includes 32-bit general purpose registers (not shown) used for scalar integer operations and address calculations. Optionally, one or more additional register file sets can be included to minimize content switching overhead, for example, during interrupt and/or exception processing. Execution unit 102 interfaces with fetch unit 104, floating point unit 106, load/store unit 108, multiple-divide unit 120 and coprocessor 122.

Fetch unit 104 is responsible for providing instructions to execution unit 102. In one embodiment, fetch unit 104 includes control logic for instruction cache 112, a recoder for recoding compressed format instructions, dynamic branch prediction, an instruction buffer to decouple operation of fetch unit 104 from execution unit 102, and an interface to a scratch pad (not shown). Fetch unit 104 interfaces with execution unit 102, memory management unit 110, instruction cache 112, and bus interface unit 116.

Floating point unit 106 interfaces with execution unit 102 and operates on non-integer data. As many applications do not require the functionality of a floating point unit, this component of processor 100 need not be present in some embodiments of the present invention.

Load/store unit 108 is responsible for data loads and stores, and includes data cache control logic. Load/store unit 108 interfaces with data cache 114 and other memory such as, for example, a scratch pad and/or a fill buffer. Load/store unit 108 also interfaces with memory management unit 110 and bus interface unit 116.

Memory management unit 110 translates virtual addresses to physical addresses for memory access. In one embodiment, memory management unit 110 includes a translation lookaside buffer (TLB) and may include a separate instruction TLB and a separate data TLB. Memory management unit 110 interfaces with fetch unit 104 and load/store unit 108.

Instruction cache 112 is an on-chip memory array organized as a multi-way set associative cache such as, for example, a 2-way set associative cache or a 4-way set associative cache. Instruction cache 112 is preferably virtually indexed and physically tagged, thereby allowing virtual-to-physical address translations to occur in parallel with cache accesses. In one embodiment, the tags include a valid bit and optional parity bits in addition to physical address bits. Instruction cache 112 interfaces with fetch unit 104.

Data cache 114 is also an on-chip memory array. Data cache 114 is preferably virtually indexed and physically tagged. In one embodiment, the tags include a valid bit and optional parity bits in addition to physical address bits. As described in more detail below, it is a feature of the present invention that components of data cache 114 can be selectively enabled and disabled to reduce the total power consumed by processor 100. Data cache 114 interfaces with load/store unit 108.

Bus interface unit 116 controls external interface signals for processor 100. In one embodiment, bus interface unit 116 includes a collapsing write buffer used to merge write-through transactions and gather writes from uncached stores.

Power management unit 118 provides a number of power management features, including low-power design features, active power management features, and power-down modes of operation.

Multiply/divide unit 120 performs multiply and divide operations for processor 100. In one embodiment, multiply/divide unit 120 preferably includes a pipelined multiplier, result and accumulation registers, and multiply and divide state machines, as well as all the control logic required to perform, for example, multiply, multiply-add, and divide functions. As shown in FIG. 1, multiply/divide unit 120 interfaces with execution unit 102.

Coprocessor 122 performs various overhead functions for processor 100. In one embodiment, coprocessor 122 is responsible for virtual-to-physical address translations, implementing cache protocols, exception handling, operating mode selection, and enabling/disabling interrupt functions. Coprocessor 122 interfaces with execution unit 102.

Example Embodiments

Typically, for a processor implementing instructions, a bug, error, lock-up or deadlock may be caused by the execution of a specific sequence of instructions that causes an undesirable change in the architectural state of the processor. For example, a sequence of two load instructions followed by a store instruction may cause a processor to lock up. However, such corner case bugs associated with a specific sequence of instructions are difficult to detect via functional simulation, especially with long sequences of instructions. Bugs are typically detected during implementation of in-field applications by a customer. If the error cannot be corrected in-field, the chips have to be recalled resulting in heavy losses for both the manufacturer and the customer. It is a feature of the invention that allows the resolution of such errors in-field without having to recall the chips. For example, if a sequence of instructions that causes an error is detected, then the next instruction in the sequence that will complete the sequence and cause the error can be stalled before it executes and a fix to prevent the error can be implemented. A manufacturer can send the customer boot code that may be run at startup to implement the desired fix or the customer can program the fix himself. Example embodiments of the invention described below illustrate the process in detail.

Figure 2:
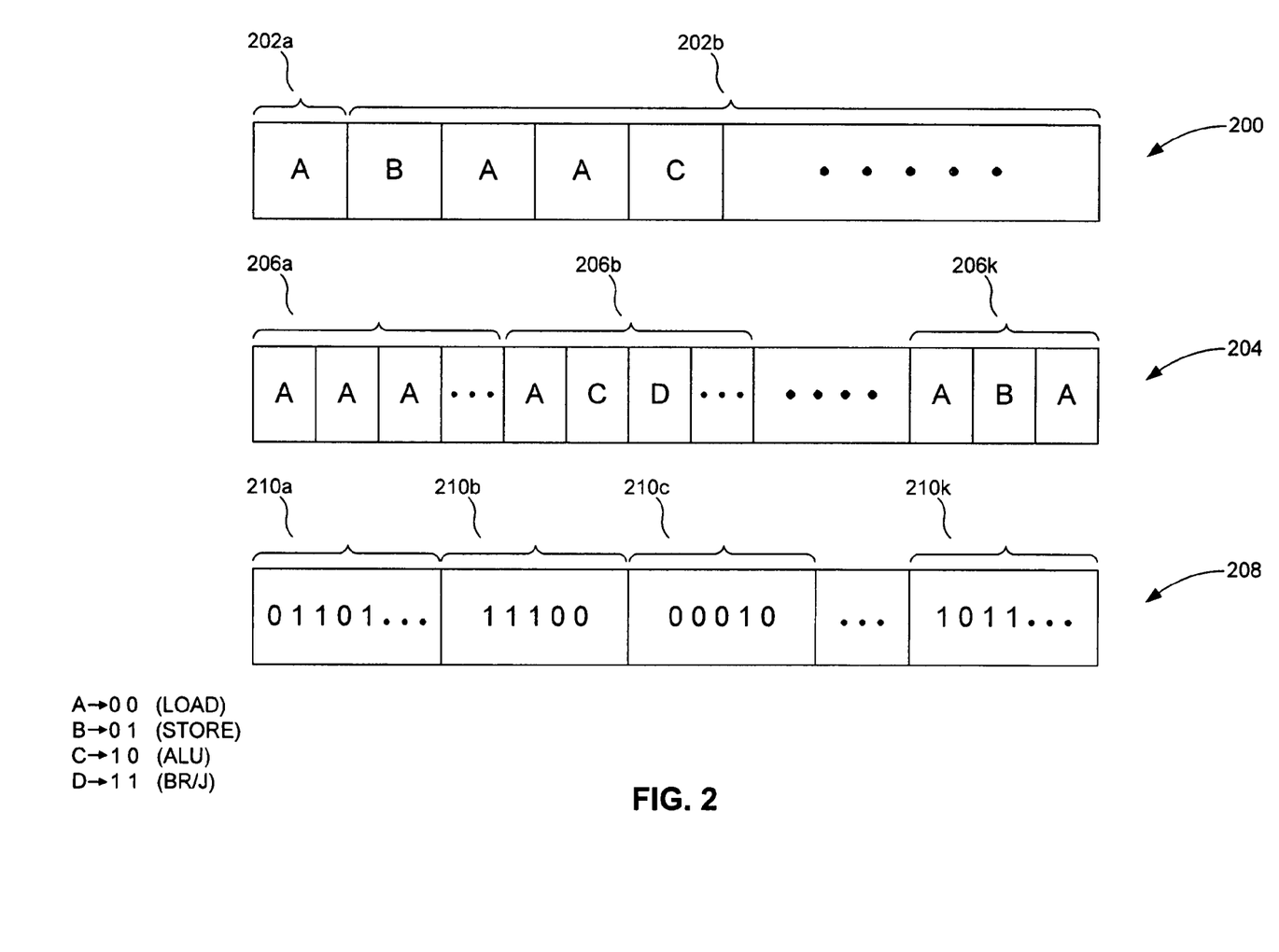
FIG. 2 illustrates example registers according to an embodiment of the invention.

FIG. 2 illustrates example buffers (i.e. registers) and their contents according to an embodiment of the invention. Buffer 200 stores values representing an instruction. In an embodiment, the values represent the type of instruction. Typically, the entire opcode or part of the opcode of the instruction represents the instruction type. Certain instruction set architectures utilize function bits in addition to the opcode to determine instruction type. Therefore, part of or all of the function bits may also be stored in buffer 200 to identify the type of an instruction. In an embodiment, buffer 200 stores the instruction types 202b of multiple instructions previously dispatched to execution unit 102, in the order of dispatch, including type 202a of a next instruction that is to be dispatched to execution unit 102. In an alternate embodiment, buffer 200 may store multiple instruction types to be dispatched to execution unit 102 along with multiple instructions previously dispatched to execution unit 102. In an embodiment, buffer 200 may also store additional information with the instruction type. For example, for a branch instruction the buffer may store values representing the address of a branch or for an arithmetic instruction the buffer may store the size of the arithmetic field in addition to the type of the instruction. In yet another embodiment, the values represent parts of an instruction, coded or un-coded or the entire instruction, coded or un-coded, or any combination thereof. For example, for certain instructions only parts of the instruction, coded or un-coded may be stored and for other instructions, the entire instruction may be stored, coded or un-coded. For ease of illustration, a value representing an instruction type is illustrated as a letter. As shown in FIG. 2, "A" corresponds to binary 00 and represents load type instructions, "B" corresponds to binary 01 and represents store type instructions, "C" corresponds to binary 10 and represents arithmetic type instructions; and "D" corresponds to binary 11 and represents branch or jump type instructions.

In an example, with an 8-bit opcode, instructions can be coded in the following ways. The two most-significant-bits of the opcode may be used to differentiate between types of instructions. For instance, 10xxxxxx (where x is a don't-care bit) could stand for an ALU operation, 11xxxxxx for a branch, 00xxxxxx for a load, and 01xxxxxx for a store. Sixty-four subtypes of ALU, branches, loads and stores can be defined by using the remaining bits. ALU instructions themselves may have either a register for an operand, or may reference some part of memory, or both. The third most-significant-bit may be used to show whether a memory access is needed. So 101xxxxx could identify one of 32 possible ALU instructions that need to access memory, while 110xxxxx defines one of 32 ALU instructions that do not.

The opcode may be further defined as, for example, 10x110xx is an ADD, 10x100xx is a SUBTRACT, 10x010xx is a MULTIPLY and 10x000xx is a DIVIDE. 10x111xx can be used for logical operations such as XOR, while 10x101xx can be an OR.

It is to be appreciated that the number of bits used for coding instruction types is arbitrary and dependent on implementation and design requirements. For example, if further instruction types or classifications are required, three bits may be used to define instruction types thereby allowing for eight instruction types to be defined. In an embodiment, the buffer 200 is a First In First Out (FIFO) buffer.

Mask register 204 is a programmable register used to store one or more sequences of values representing instructions, that when executed in the sequence order, cause an error or undesirable change in architectural state of processor 100. For example, a sequence of three load type instructions executed in succession may cause an error. In this case mask 206a is programmed as "AAA" to represent a sequence of three load type instructions. In an embodiment, mask register 204 may store k masks 206a-k where each mask represents a different sequence of instruction types. In an example, the mask register is a co-processor register such as co-processor register 0 in co-processor 122. The co-processor 0 mask register can be programmed with a sequence using an instruction such as MTC0 (Move To Coprocessor Register 0) that moves an immediate value into co-processor register 0.

Fix register 208 is a programmable register that stores control bits. The control bits may be used to generate control signals that perform a desired action. In an embodiment, each mask sequence in mask register 204 has a corresponding sequence of control bits in fix register 208. As shown in FIG. 2, if mask register has k mask entries 206a-k, then fix register 208 has corresponding k control bit entries 210a-k. In an alternate embodiment, a particular entry of control bits may be used for multiple mask entries and hence the number of entries 210 may be less then the number of mask entries 206. In yet another embodiment, each entry 210 may be a single control bit. For example, the control bit when set may be used to generate a control signal that stalls the pipeline in one embodiment, or clears an instruction buffer in another embodiment, or causes a jump to exception handling code in yet another embodiment. Further examples of control bits and control signals are described below.

Figure 3A:
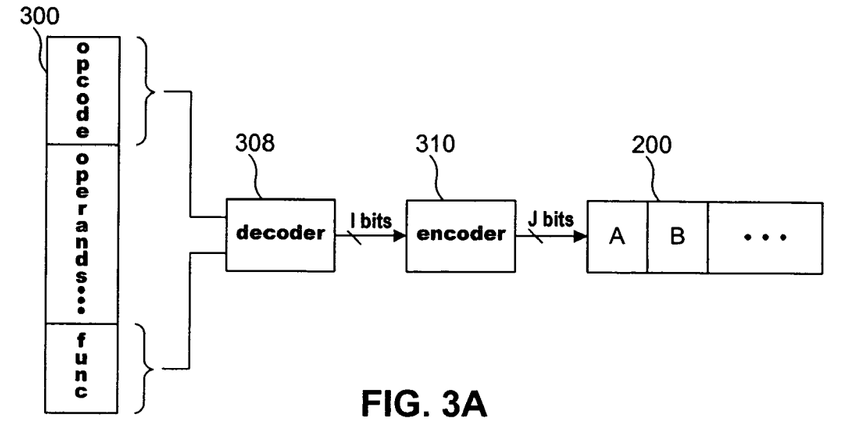
FIGS. 3A-C illustrates example systems to generate and store values representing instructions according to embodiments of the invention.
Figure 3B:
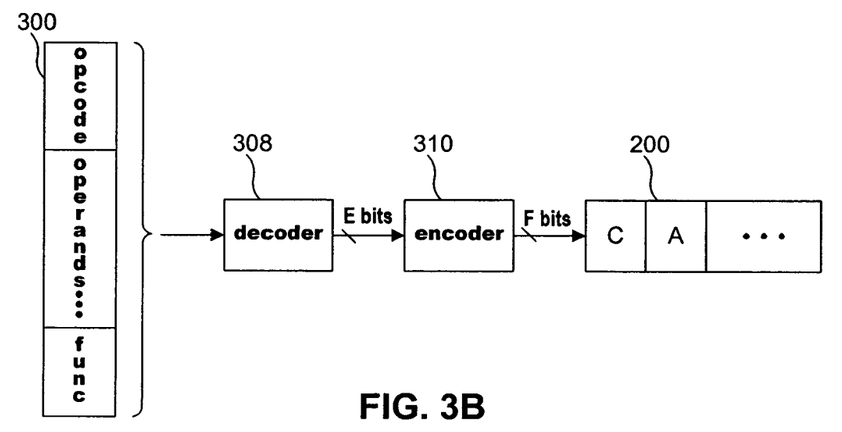
Figure 3C:
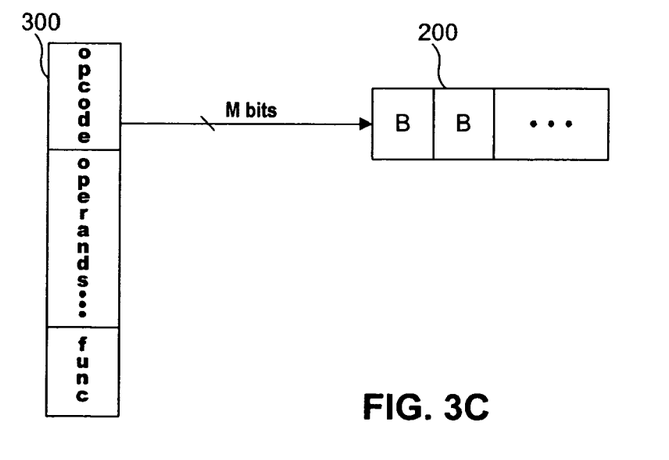

FIGS. 3A-C illustrate example systems to generate and store values representing instructions according to embodiments of the invention. In the examples in FIGS. 3A-3C, instruction 300 comprises fields for opcode, operands and function. It is to be appreciated that the fields illustrated for instruction 300 are for example purposes, and instruction 300 may be comprised of a fewer or greater number of fields.

FIG. 3A illustrates an example system to code and store opcode and function fields of an instruction according to an embodiment of the invention. Opcode and function fields of instruction 300 are fed into decoder 308 that generates I decoded bits. Encoder 310 encodes the I bits to generate J bits of code representing instruction type of instruction 300. The J encoded bits are stored in buffer 200. For example, decoder 308 may accept opcode and function fields of instruction 300 to generate an 8 bit decoded signal I which is then encoded into a 3 bit encoded signal J by encoder 310 and stored in buffer 200. In an alternate embodiment, only the opcode field is decoded by decoder 308, encoded by encoder 310 and stored in buffer 200.

FIG. 3B illustrates an example system to code and store an instruction 300 according to an alternate embodiment of the invention. In this example, decoder 308 decodes the entire instruction 300 to generate E bits which are encoded by encoder 310 into F encoded bits and stored in buffer 200. In an example, instruction 300 is decoded by decoder 308 to generate 32 bits (E bits) which are encoded by encoder 310 into 4 bits (F bits) and stored in buffer 200.

Encoder 310 may select and encode only the opcode and selected operand bits from the E decoded bits. For example for a branch instruction, encoder 310 may encode the branch opcode along with the address operand and store the result in buffer 200. Decoding the entire instruction 300 allows for greater flexibility in generating codes representing an instruction but may result in an increase in cost and hardware real estate in comparison. However, since each instruction 300 has to be decoded before it can be executed, if these decoded bits are utilized to generate codes representing instructions, the hardware overhead can be reduced.

FIG. 3C illustrates an example of storing an opcode field of an instruction according to an embodiment of the invention. In this example, each of M bits of an opcode field of instruction 300 are stored directly into buffer 200. Elimination of decoder 308 and encoder 310, in the present example, reduces hardware real estate and costs. However, since the opcode field of instruction 300 is not encoded, the number of instruction types that can be stored in buffer 200 is reduced compared to the examples in FIGS. 3A-3B for a given buffer size. It is to be appreciated that encoder 310 is optional and the E or I decode bits may be stored directly. The F, J and M bits that are stored in buffer 200 may be the same number of bits, for example, each of F, J and M may be 2 bits each or a different number of bits.

Figure 4A:
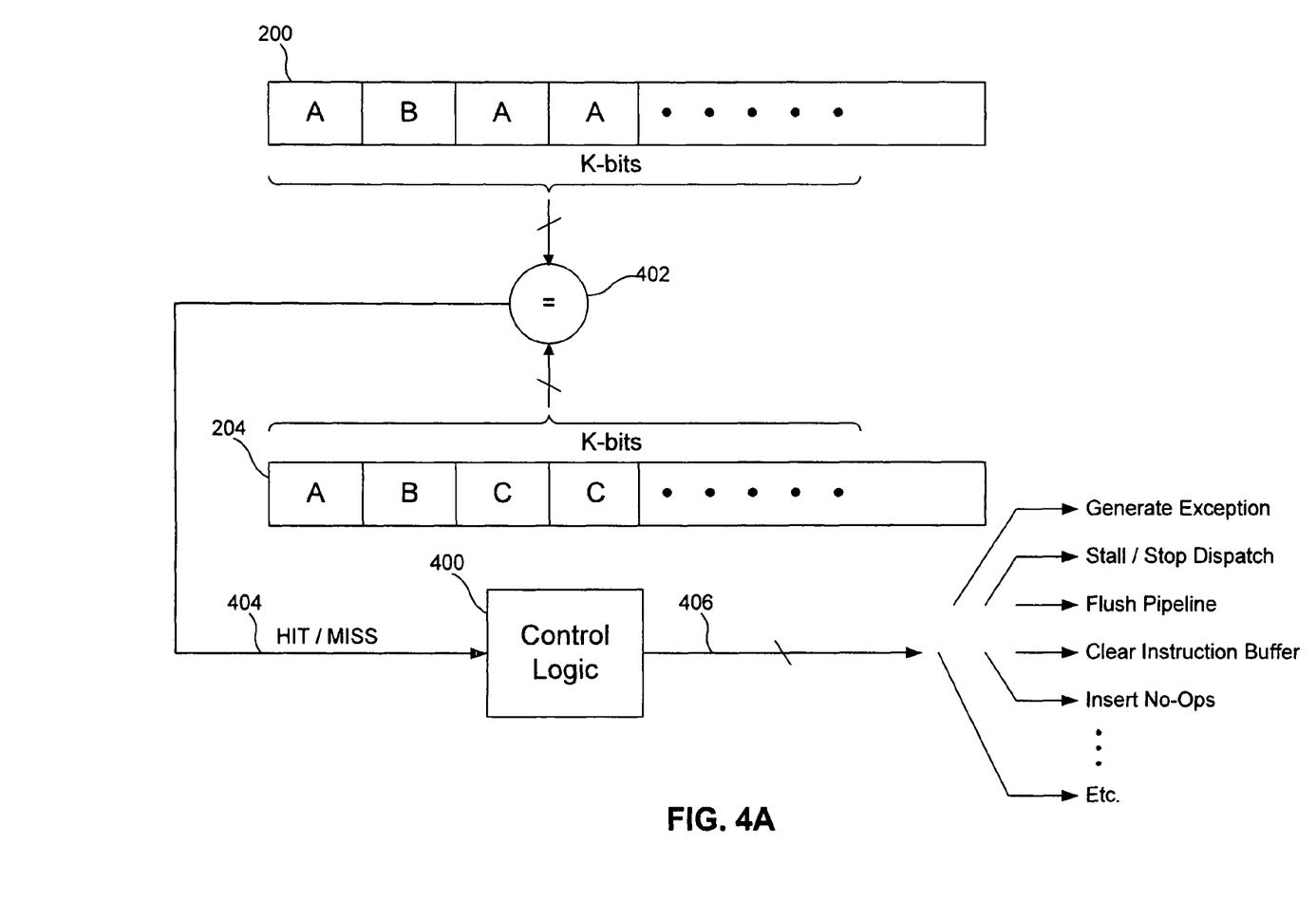
FIG. 4A illustrates an example system to detect a sequence of instruction types and implement a desired action according to an embodiment of the invention.

FIG. 4A illustrates an example system to detect a sequence of values representing instructions and implement a desired action according to an embodiment of the invention. In the example shown in FIG. 4A, mask register 204 stores a single sequence of values that comprise a K bit mask. The values are of the same format as those stored in buffer 200 and, as described above, may be generated by similar logic as that used to generate values for buffer 200. The K bits representing values in buffer 200 represent the latest sequence of instructions dispatched into execution unit 102 and the next instruction to be dispatched into execution unit 102. Comparator 402 compares the K bit mask in register 204 with K bits in buffer 200. The result of the comparison by comparator 402 is a hit/miss signal 404. Signal 404 is a "hit", if there is match between the K bit sequence in mask register 204 and the K bit sequence in buffer 200. Signal 404 is a "miss" if there isn't a match. A hit may be represented by a high signal or a logical "1" and a miss by a low signal or logic "0". Signal 404 is fed into control logic 400 that is used to generate W bits of control signal 406. Control signals 406 generated by control logic 400 are used to implement a desired action when a hit is indicated by signal 404. The desired action may be to generate an exception signal, stall a pipeline, prevent dispatch of the next instruction, flush one or more parts of the pipeline of instructions, clear the instruction buffer of one or more instructions and re-fetch one or more instructions, starting from a specific address, insert no-ops or bubbles into the instruction stream, etc. Example implementations of control logic 400 and control signals 406 are described below.

Figure 4B:
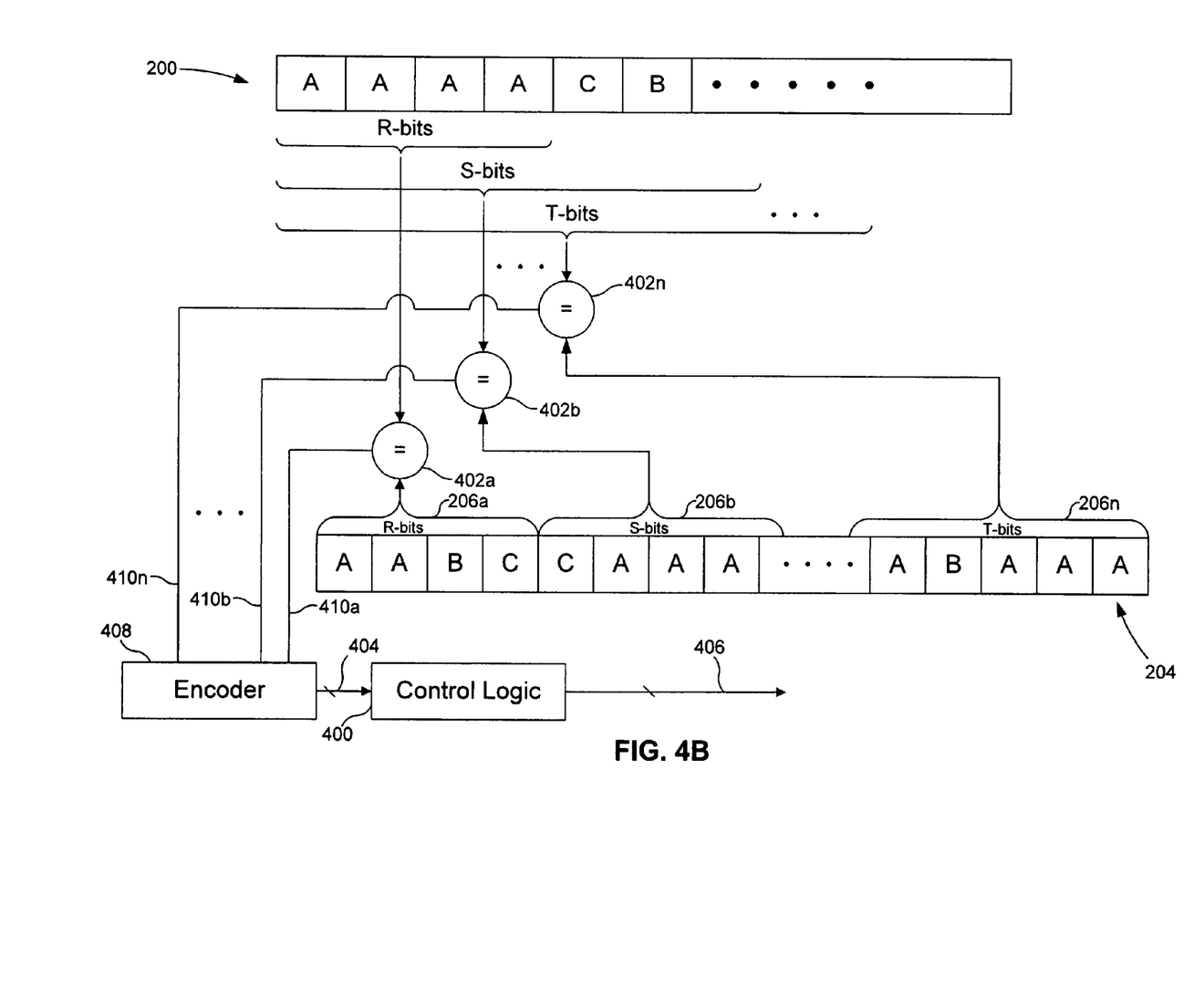
FIG. 4B illustrates an example system to check multiple sequences of instruction types and implement a desired action according to an embodiment of the invention.

FIG. 4B illustrates an example system to check multiple sequences of instruction types and implement a desired action(s) according to an embodiment of the invention. In this example, mask 204 stores N instruction sequences 206a-n. Each sequence 206 may contain a different number of values representing instructions. N comparators 402a-n are used to compare the N instruction sequences to corresponding N instruction sequences in buffer 200. For example, comparator 402a compares R bits of sequence 206a with R bits in buffer 200, comparator 402b compares S bits of sequence 206b with S bits in buffer 200 and comparator 402n compares T bits of sequence 206n with T bits in buffer 200. The R, S and T bits in buffer 200 represent, for example, the next instruction to be dispatched to execution unit 102 and the latest instructions that were dispatched before the next instruction. Comparators 402a-n each generate a corresponding hit/miss signal 404a-n. To reduce the number of signal buses, signals 404a-n may be encoded by encoder 408 to generate hit/miss signal 404 that is provided to control logic 400. Control signal 406 is generated by control logic 400 based on hit/miss signal 404 from encoder 408. Alternatively, hit/miss signals 404a-n may be fed directly into control logic 400 to generate control signal 406. If there is a hit for one of the sequences 206a-n, then based on the hit/miss signal 404a-n that is high, control logic generates a corresponding control signal 406 to perform a desired action as described above. Further example implementations of control logic 400 and control signals 406 are described below.

Figure 5A:
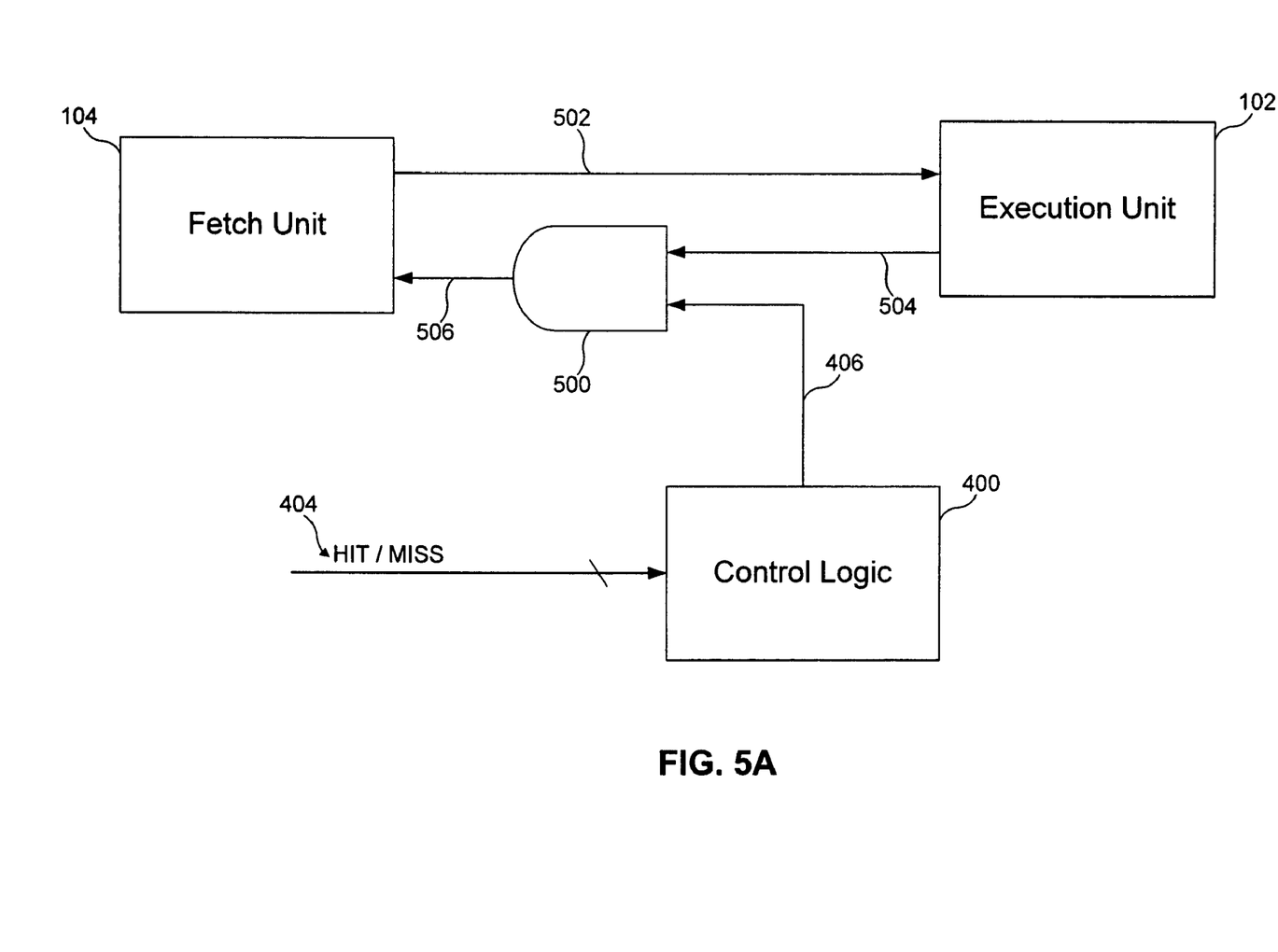
FIG. 5A illustrates an example system to stall instruction dispatch according to an embodiment of an instruction.

FIG. 5A illustrates an example system to stall instruction dispatch according to an embodiment of an instruction. Instruction fetch unit 104 sends an instruction 502 to execution unit 102 in response to receiving an acknowledge signal 504 from execution unit 102. Typically, signal 504 is fed directly into fetch unit 104. If signal 504 is high, it indicates that execution unit 102 is ready to receive another instruction on bus 502. According to the embodiment shown in FIG. 5A, signal 504 is fed into an AND gate 500 along with control signal 406 and the output of AND gate 500 is a signal 506 that is fed into fetch unit 104. In this example control signal 406 is an instruction stall signal. In the event that a sequence of instructions that cause an error is detected and the next instruction in the sequence is the instruction that will cause the error, then stall signal 406 is set low by control logic 400. The low stall signal 508 causes the output signal 506 to be low and, as a result, fetch unit 104 will not dispatch a next instruction to execution unit 102. In an embodiment, control logic 400 may assert the low stall signal 406 to prevent instruction dispatch until a pipeline in execution unit 102 is cleared. In another embodiment, control logic 400 asserts the low stall signal while implementing another fix such as generating an exception or inserting a no-op instruction in an execution unit 102 pipeline. After a fix has been implemented, the signal 406 is asserted high to allow for instructions to be dispatched and normal operation to resume. Further example fixes are described below.

Figure 5B:
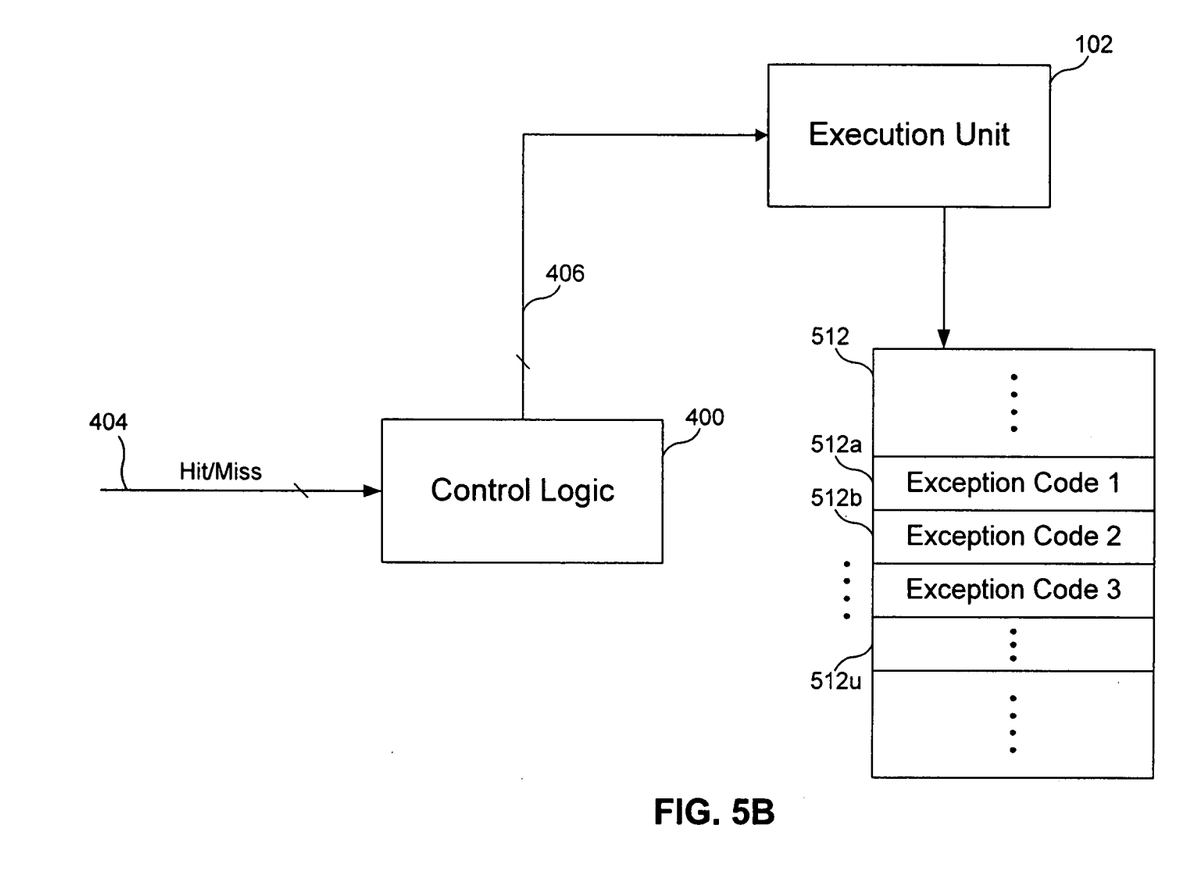
FIG. 5B illustrates an example system to generate an exception according to an embodiment of the invention.

FIG. 5B illustrates an example system to generate an exception according to an embodiment of the invention. In the present example, control logic 400, based on hit/miss signal 404, determines whether a match was detected in a sequence in mask register 204 and buffer 200. Upon determining that there is a match, control signal 406 causes execution unit 102 to jump to exception handling code 512 for the corresponding mask that generated the match. In an embodiment, signal 406 is a multi-bit bus that selects one of multiple pre-programmed exception handling codes 512a-u.

Figure 5C:
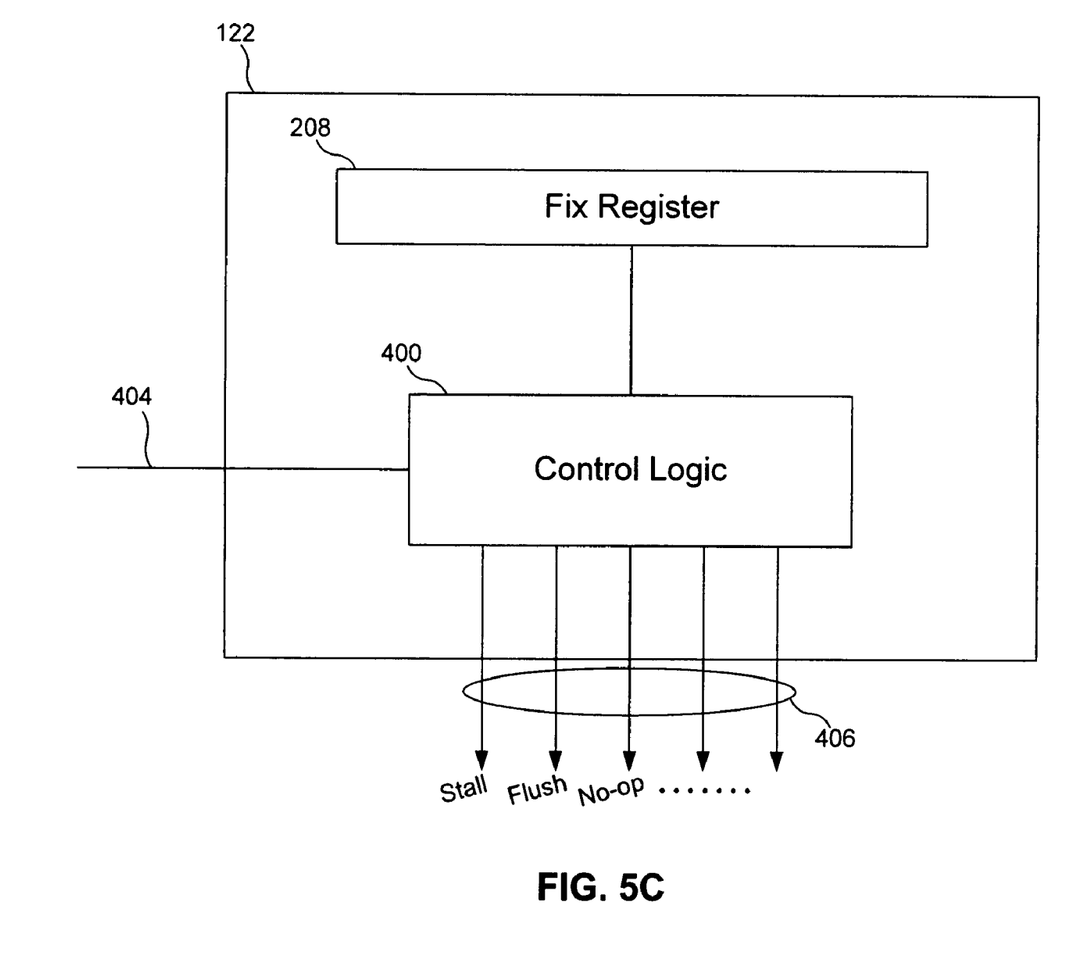
FIG. 5C illustrates an example of using a fix register to generate control signals according to an embodiment of the invention.

FIG. 5C illustrates an example of using fix register 208 to generate control signals 406 according to an embodiment of the invention. In the present example, control logic 400 is a decoder that, based on hit/miss signal 404, selects values stored into fix register 208. For example, if there is a match for one of multiple masks in mask register 204, then the corresponding bit in hit/miss signal 404 is high. Control logic 400 selects the control bits in fix register 208 based on which bit in signal 404 is high. Based on the value selected from fix register 208, control logic 400 sets one or more of the lines in control signal 406. As shown in FIG. 5C, signal 406 may cause at least one of a stall, a pipeline flush, a no-op, an interrupt etc. depending on signal 404 and values in fix register 208. For example, based on the bits in fix register 208, control signals 406 may cause a stall in a pipeline and then flush out instructions in the pipeline.

In an example, fix register 208 and control logic 400 are part of co-processor 122, and fix register 208 is a programmable co-processor register. As described above, instructions such as MTC0 allow a programmer to store values into fix register 208. This allows for flexible in-field applications. For example, a chip with a processor core 100 is shipped to a customer. The customer detects that a sequence of instructions causes an error in the chip. The customer can program that sequence in mask register 204, and program a corresponding desired action in fix register 206 to circumvent the error without the chip being rendered inoperative or sent back to the manufacturer.

Figure 5D:
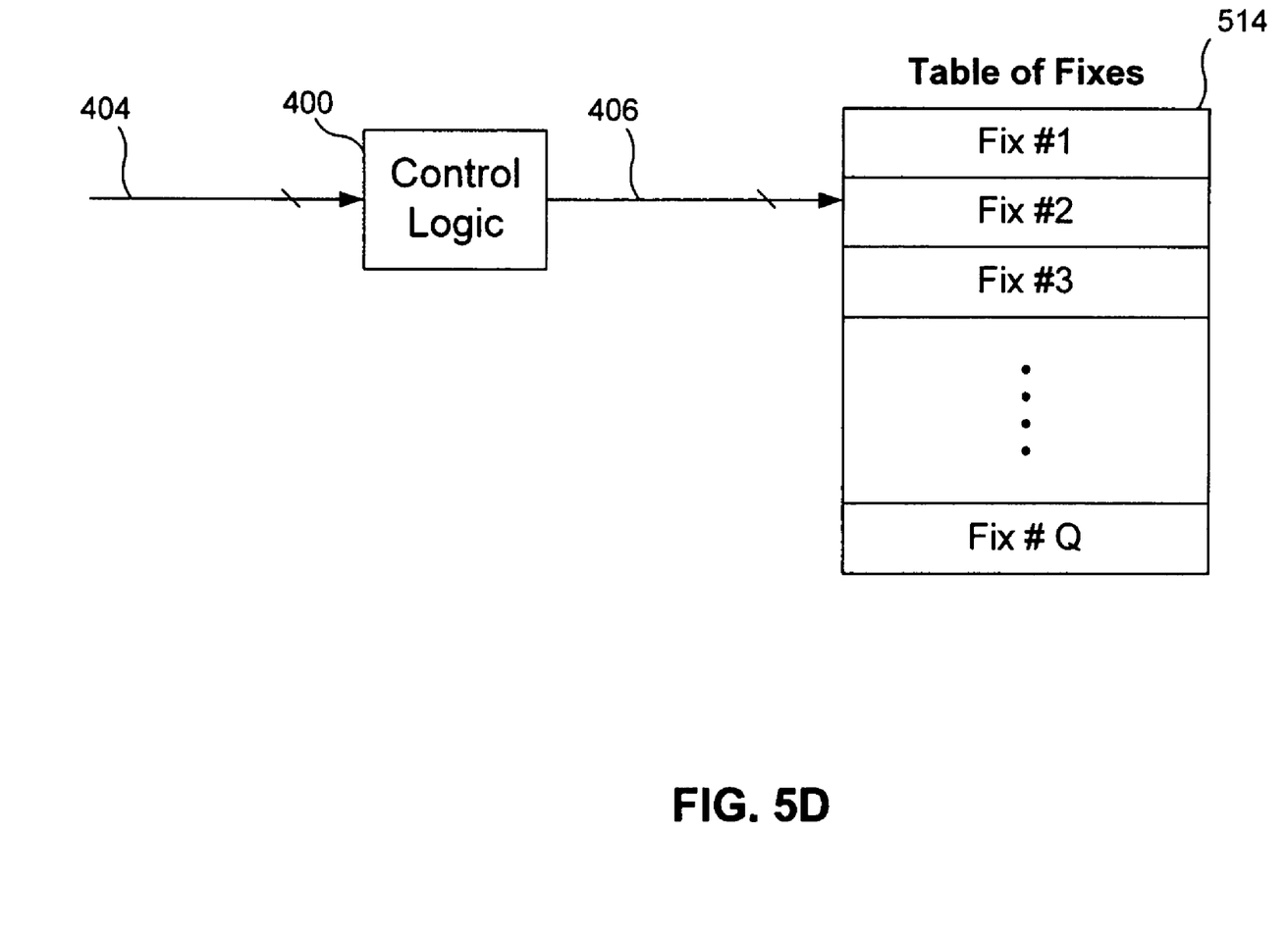
FIG. 5D illustrates an example system to use a table to implement predetermined actions according to an embodiment of the invention.

FIG. 5D illustrates an example system including a table to implement predetermined actions (e.g. fixes) according to an embodiment of the invention. Table 514 stores Q fixes or actions to be performed. In this example, control logic 400 generates control signals 406 to select one or more of the Q predetermined actions in table 514. Control logic may be programmed to select a predetermined action corresponding to a mask in mask register 204 that generates a match. For example, if the fourth mask in mask register 204 generates a match, then the fourth fix in the table may be used. This allows a chip manufacturer to pre-program fixes and a chip user to associate a mask and fix accordingly. Table 1 below illustrates an example of associations between mask values and fixes. In addition, multiple masks, as shown below, may be associated with a single fix, and a single mask may be associated with multiple fixes.

TABLE 1

| Mask(s) | Table of Fixes |
|---|---|
| Mask #1 and #2 | Stall |
| Mask #3 | Flush |
| Mask #4 | No-op |
| Mask #4 | Exception #1 |
| Mask #5 | Exception #2 |

In the example shown above in Table 1, the pre-programmed table of fixes has the options of stalling a pipeline, flushing the pipeline, inserting a no-op in the pipeline, generating a first exception and generating a second exception. The corresponding masks associated with fixes may be programmed. For example, a match on masks 1 and 2 generates a stall, a match on mask 3 results in flushing of the pipeline, a match on mask 4 causes a no-op to be inserted along with generation of a first exception which causes a jump to exception handling code, and a match on mask 5 causes a second exception. Masks 1-5 may be, for example, masks 206a-e as shown in FIG. 2.

Figure 6:
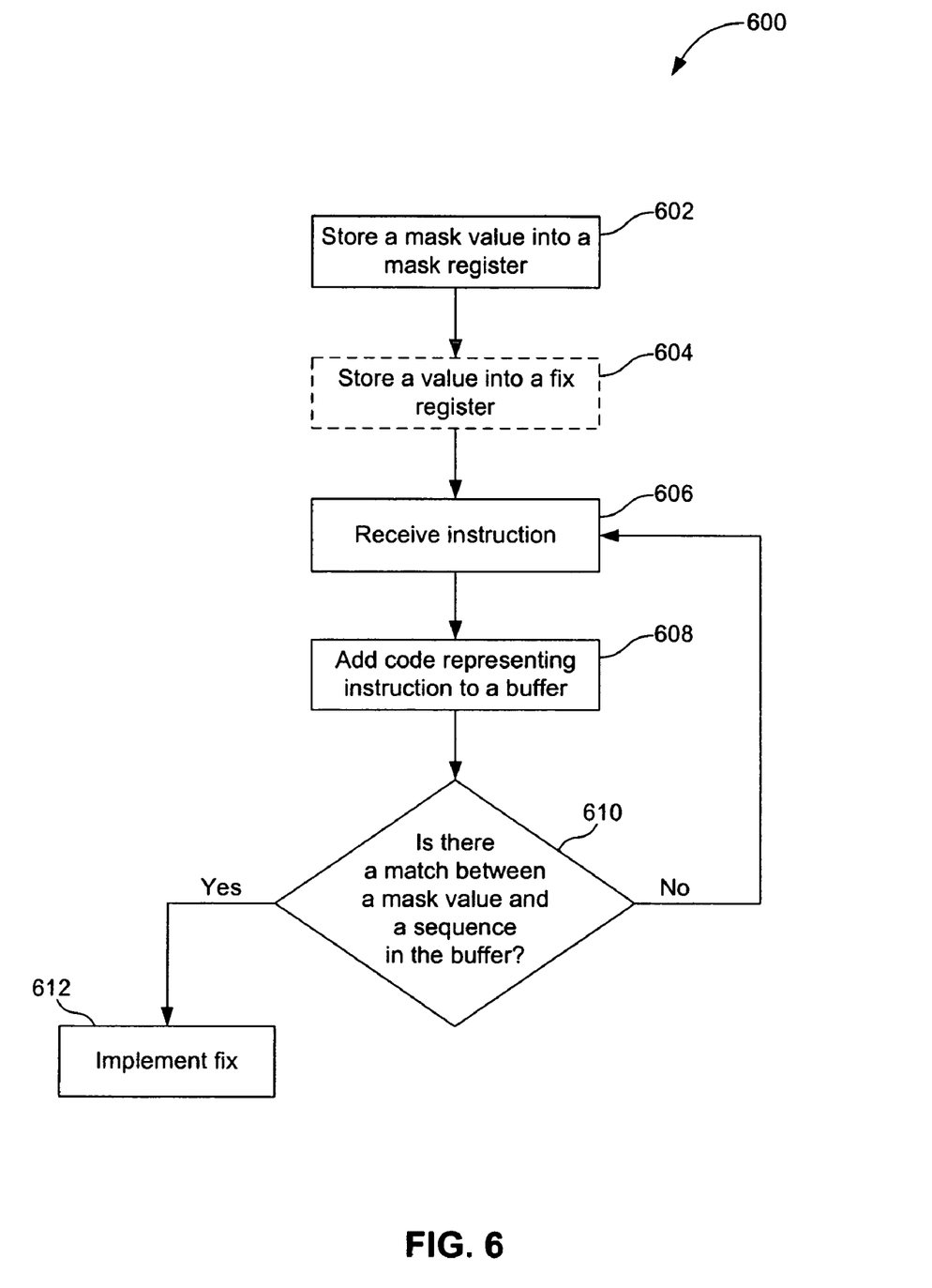
FIG. 6 illustrates a flowchart showing steps according to an embodiment of the invention.

FIG. 6 illustrates a flowchart 600 showing a method according to an embodiment of the invention. Other structural and operational embodiments will be apparent to persons skilled in the relevant art(s) based on the following discussion. The steps shown in FIG. 6 do not necessarily have to occur in the order shown. The steps of FIG. 6 are described below in further detail.

In 602, one or more mask values are stored in a register. The mask value is a typically a sequence of values representing instructions as described above. Optionally, in 604, one or more fix values are stored in a register. The fix values may correspond to the one or more mask values stored in 602. The fix values may be control bits used to generate control signals that implement desired actions. In 606, an instruction is received. The instruction is received prior to being sent to an execution unit. The instruction may be received in, for example, an instruction fetch buffer. In 608, a value representing the instruction type is determined and stored in a buffer. In 610, it is determined whether there is a match between a sequence stored in mask register from 602 and a sequence stored in the buffer from 608. In 612, if a match is detected in 610, a desired action corresponding to the matched mask value is implemented. In an embodiment, the desired action is determined based on the values stored in the fix register from 604. If it is determined in 610, that there is no match between any sequence in mask register from 602 and buffer from 608, then the process returns to 606.

Example System

Figure 7:
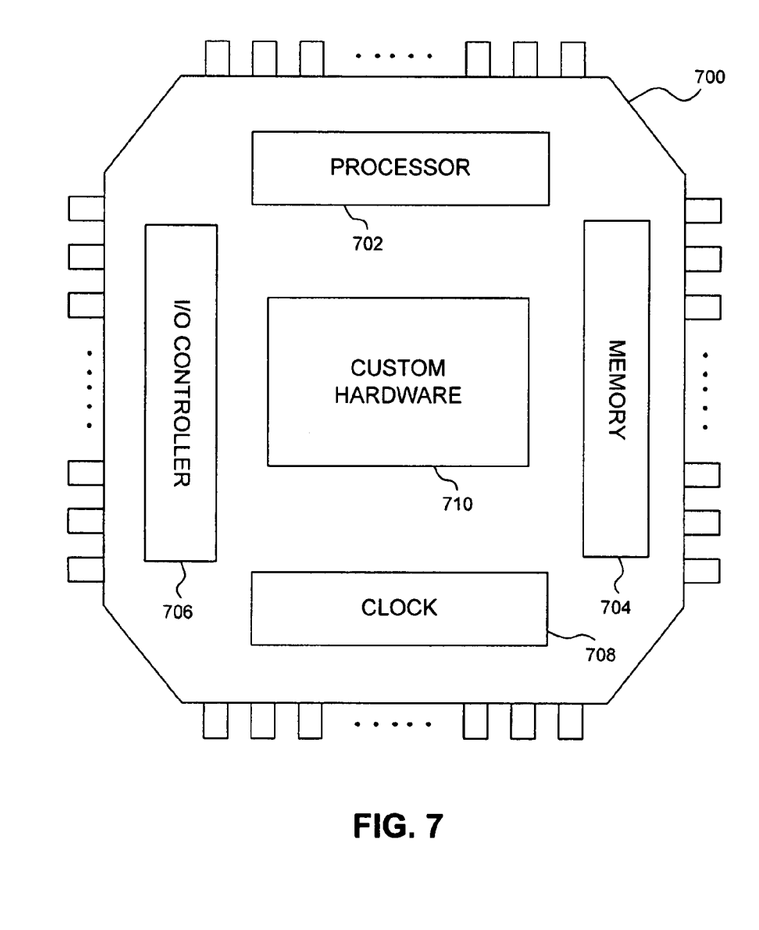
FIG. 7 is a diagram of an example system according to an embodiment of the present invention.

FIG. 7 is a diagram of an example system 700 according to an embodiment of the present invention. System 700 includes a processor 702, a memory 704, an input/output (I/O) controller 706, a clock 708, and custom hardware 710. In an embodiment, system 700 is a system on a chip (SOC) in an application specific integrated circuit (ASIC).

Processor 702 is any processor that includes features of the present invention described herein and/or implements a method embodiment of the present invention. In one embodiment, processor 702 includes an instruction fetch unit, an instruction cache, an instruction decode and dispatch unit, one or more instruction execution unit(s), a data cache, a register file, and a bus interface unit similar to processor 100 described above.

Memory 704 can be any memory capable of storing instructions and/or data. Memory 704 can include, for example, random access memory and/or read-only memory.

Input/output (I/O) controller 706 is used to enable components of system 700 to receive and/or send information to peripheral devices. I/O controller 706 can include, for example, an analog-to-digital converter and/or a digital-to-analog converter.

Clock 708 is used to determine when sequential subsystems of system 700 change state. For example, each time a clock signal of clock 708 ticks, state registers of system 700 capture signals generated by combinatorial logic. In an embodiment, the clock signal of clock 708 can be varied. The clock signal can also be divided, for example, before it is provided to selected components of system 700.

Custom hardware 710 is any hardware added to system 700 to tailor system 700 to a specific application. Custom hardware 710 can include, for example, hardware needed to decode audio and/or video signals, accelerate graphics operations, and/or implement a smart sensor. Persons skilled in the relevant arts will understand how to implement custom hardware 710 to tailor system 700 to a specific application.

While various embodiments of the present invention have been described above, it should be understood that they have been presented by way of example, and not limitation. It will be apparent to persons skilled in the relevant computer arts that various changes can be made therein without departing from the scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

For example, in addition to implementations using hardware (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code and/or instructions disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), hardware description languages (HDL) including Verilog HDL, VHDL, SystemC Register Transfer Level (RTL) and so on, or other available programs, databases, and/or circuit (i.e., schematic) capture tools. Such software can be disposed in any known computer usable medium including semiconductor, magnetic disk, optical disk (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalence.

What is claimed is:

1. A processor core, having an execution unit for processing instructions, comprising:
    a programmable mask register;
    a decoder to decode each instruction in a sequence of instructions to generate decoded bits;
    an encoder coupled to the decoder and configured to selectively encode the decoded bits to produce values representing the sequence of instructions, wherein each value is smaller in size than an instruction that it represents;
    a buffer that stores the values representing the sequence of instructions; and
    control logic to determine whether there is a match between a sequence in the mask register and the values representing the sequence of instructions in the buffer and, upon detecting a match, to generate control signals to perform a desired action.

2. The processor core of claim 1, further comprising a programmable fix register.

3. The processor core of claim 2, wherein the control logic generates the control signals based on control bits stored in the fix register.

4. The processor core of claim 1, wherein the control signals prevent an unwanted change in the architectural state of the processor core.

5. The processor core of claim 1, wherein the control signals stall dispatch of a next instruction to the execution unit.

6. The processor core of claim 1, wherein the control signals insert at least one bubble in a pipeline of the processor.

7. The processor core of claim 1, wherein the control signals generate an exception.

8. The processor core of claim 1, wherein the control signals flush at least a portion of a pipeline of the processor.

9. The processor core of claim 1, wherein the control signals delete instructions in the instruction buffer and re-fetch instructions starting from a specified address.

10. The processor core of claim 1, wherein a first value stored in the buffer includes only an opcode of an instruction.

11. The processor core of claim 1, wherein a first value stored in the buffer includes an encoded opcode of an instruction.

12. The processor core of claim 1, wherein the buffer stores values representing instructions that are to be dispatched to the execution unit.

13. A tangible computer readable storage medium comprising a processor embodied in software, the processor comprising:
    a programmable mask register;
    a decoder to decode each instruction in a sequence of instructions to generate decoded bits;
    an encoder coupled to the decoder and configured to selectively encode the decoded bits to produce values representing the sequence of instructions, wherein each value is smaller in size than an instruction that it represents;
    a buffer that stores the values representing the sequence of instructions; and
    control logic to determine whether there is a match between a sequence in the mask register and the sequence in the buffer and, upon detecting a match, to generate control signals to perform a desired action.

14. The tangible computer readable storage medium of claim 13, further comprising a programmable fix register.

15. The tangible computer readable storage medium of claim 14, wherein the control logic generates the control signals based on control bits stored in the fix register.

16. The tangible computer readable storage medium of claim 13, wherein the control signals prevent an unwanted change in the architectural state of the processor core.

17. The tangible computer readable storage medium of claim 13, wherein the processor is embodied in hardware description language software.

18. The tangible computer readable storage medium of claim 13, wherein the processor is embodied in one of Verilog hardware description language software and VHDL hardware description language software.

19. An instruction dispatch unit for a processor, comprising:
    a decoder to decode each instruction in a sequence of instructions to generate decoded bits;
    an encoder coupled to the decoder and configured to selectively encode the decoded bits to produce values representing instruction types being dispatched to an execution unit, wherein each value is smaller in size than an instruction that it represents;
    a buffer that stores the values representing instruction types being dispatched to an execution unit;
    a software accessible mask register enabled to store at least one sequence of values representing instruction types; and
    control logic to determine whether there is a match between a sequence in the mask register and a sequence in the buffer and to generate control signals to perform a desired action upon determining a match.

20. A method to prevent an unwanted change in the architectural state of a processor, the method comprising:
    storing a mask value in a programmable mask register;
    decoding each instruction in a sequence of instructions to generate decoded bits;
    encoding the decoded bits to produce values representing the sequence of instructions, wherein each value is smaller in size than an instruction that it represents;
    storing the values representing the sequence of instructions in a buffer;
    determining whether there is a match between the mask value in the mask register and the sequence in the buffer; and
    upon detecting a match, generating control signals to perform a desired action.

21. A method to detect a sequence of instructions that causes an error in a processor and to implement a solution, the method comprising:
    storing a mask value in a programmable mask register;
    decoding each instruction in a sequence of instructions being dispatched to an execution unit to generate decoded bits;
    encoding the decoded bits to produce values representing the sequence of instructions, wherein each value is smaller in size than an instruction that it represents;
    storing the values in an instruction type buffer;
    detecting an instruction to be dispatched to the execution unit whose execution will result in an error, based on a comparison between a mask in the mask register and a sequence of values in the instruction type buffer; and upon detecting the instruction, generating control signals to perform a desired action.

22. A system comprising:

a decoder to decode each instruction in a sequence of instructions to generate decoded bits;

an encoder coupled to the decoder and configured to selectively encode the decoded bits to produce values representing instruction types being dispatched to an execution unit, wherein each value is smaller in size than an instruction that it represents;

a buffer that stores the values representing instruction types dispatched to an execution unit;

a software accessible mask register enabled to store at least one sequence of values representing instruction types; and control logic to determine whether there is a match between a sequence in the mask register and a sequence in the buffer and to generate control signals to perform a desired action upon determining a match.

23. In an integrated circuit chip including a microprocessor, a method for preventing an unwanted condition caused by execution of a particular sequence of instructions, comprising:

providing a first register configured to store a mask value;

providing a circuit to decode each instruction in a sequence of instructions to generate decoded bits;

providing a circuit to encode the decoded bits to produce values representing the sequence of instructions, wherein each value is smaller in size than an instruction that it represents;

providing a second register configured to store the values representing the sequence of instructions;

providing a circuit to compare values in the second register with the mask value stored in the first register and to produce a match indication when a particular sequence of instructions matches the mask value; and providing a circuit to generate control bits in response to the match indication, wherein the control bits cause the execution unit to perform a desired action.

24. The method of claim 23, wherein the step of providing a second register comprises:

providing a second register, wherein the second register is a first-in, first-out buffer configured to store a value representing a particular instruction before the particular instruction is executed by the execution unit.

* * * * *